(12) United States Patent
Shin et al.

(10) Patent No.: US 7,644,588 B2
(45) Date of Patent: Jan. 12, 2010

(54) MAGNETIC REFRIGERATOR

(75) Inventors: Seung Hoon Shin, Seoul (KR); Dong Kwan Lee, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 0 days.

(21) Appl. No.: 12/143,459

(22) Filed: Jun. 20, 2008

(65) Prior Publication Data
US 2009/0019859 A1    Jan. 22, 2009

Related U.S. Application Data (63) Continuation of application No. PCT/KR2006/004713, filed on Nov. 10, 2006.

(30) Foreign Application Priority Data
Dec. 21, 2005    (KR) ........................ 10-2005-0126984

(51) Int. Cl.
    F25B 21/00    (2006.01)
(52) U.S. Cl. ........................................... 62/3.1
(58) Field of Classification Search ............... 62/3.1
    See application file for complete search history.

(56) References Cited

U.S. PATENT DOCUMENTS

| 4,030,312 A * | 6/1977 | Wallin et al. ............... 62/235.1 |
| 4,599,866 A * | 7/1986 | Nakagome et al. ............. 62/3.1 |
| 5,249,424 A * | 10/1993 | DeGregoria et al. ........... 62/3.1 |
| 5,357,756 A * | 10/1994 | Lubell ........................... 62/3.1 |
| 6,347,528 B1 * | 2/2002 | Iritani et al. ................ 62/324.6 |
| 6,526,759 B2 * | 3/2003 | Zimm et al. .................. 62/3.1 |
| 6,668,560 B2 | 12/2003 | Zimm et al. |
| 6,676,772 B2 * | 1/2004 | Saito et al. ................... 148/301 |
| 2004/0187939 A1 * | 9/2004 | Phillips ................. 137/625.65 |

FOREIGN PATENT DOCUMENTS

| JP | 3070944 | 3/1991 |
| JP | 2002195683 | 7/2002 |
| JP | 2004317040 | 11/2004 |

* cited by examiner

*Primary Examiner*—William C Doerrler
(74) *Attorney, Agent, or Firm*—Edell, Shapiro & Finnan, LLC (57) ABSTRACT

The present invention relates to a magnetic refrigerator comprising separated hot and cold heat exchange units wherein a heat transfer fluid that exchanges a heat with a magnetic heat exchange unit having the magnetocaloric material pieces arranged to have a gap therebetween separately circulates through a solenoid valve.

8 Claims, 6 Drawing Sheets

MAGNETIC REFRIGERATOR

CROSS REFERENCE TO RELATED APPLICATIONS

This application is a continuation of International Application No. PCT/KR2006/004713, filed on Nov. 10, 2006, entitled "Magnetic Refrigerator," which claims priority under 35 U.S.C. §119 to Application No. KR 10-2005-0126984 filed on Dec. 21, 2005, entitled "Magnetic Refrigerator," the entire contents of which are hereby incorporated by reference.

BACKGROUND

The present invention relates to a magnetic refrigerator comprising separated hot and cold heat exchange units wherein a heat transfer fluid that exchanges a heat with a magnetic heat exchange unit having the magnetocaloric material pieces arranged to have a gap therebetween separately circulates through a solenoid valve.

Figure 1:
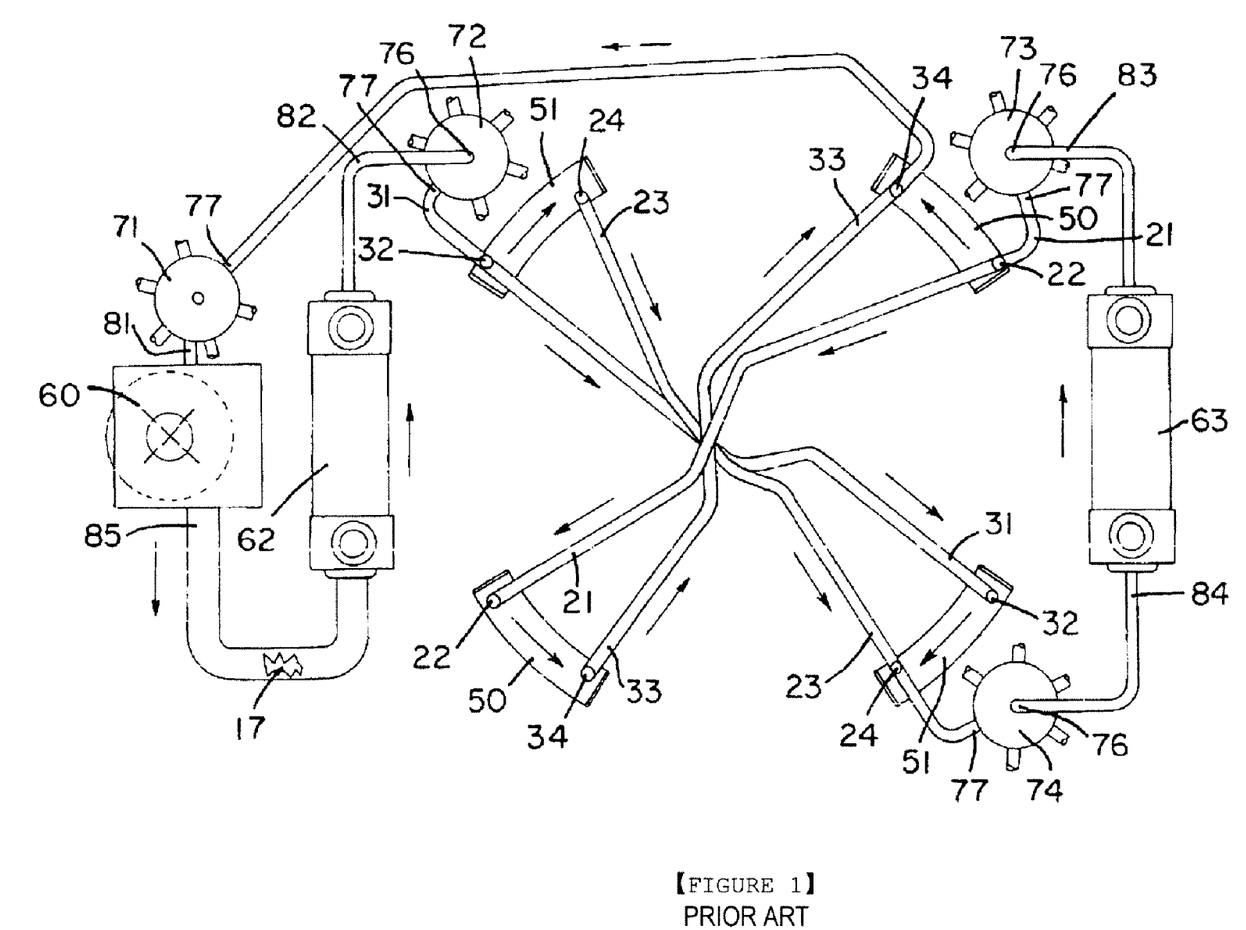
FIG. 1 is a plan view illustrating a heat transfer fluid in a conventional rotational magnet magnetic refrigerator.
Figure 2:
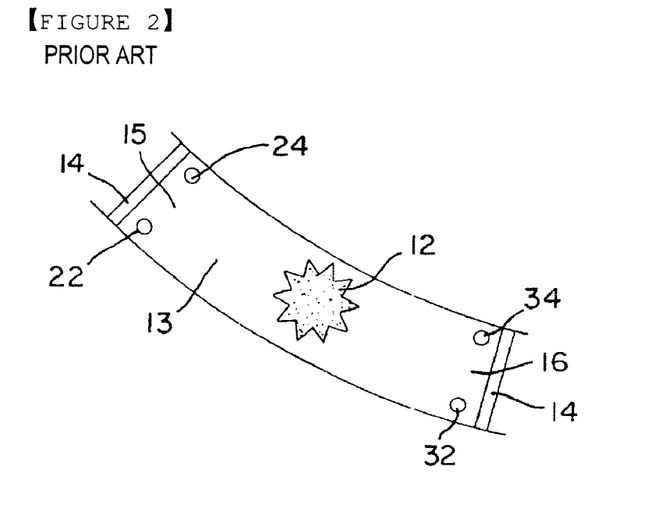
FIG. 2 is a plan view exemplifying a magnetic heat exchange unit including a magnetocaloric material of a powder type of FIG. 1.

A conventional magnetic refrigerator is disclosed in U.S. Pat. No. 6,668,560. As shown in FIGS. 1 and 2, in accordance with the conventional magnetic refrigerator, while a heat transfer fluid 17 entering into a cold side inlet port 22 through a cold side inlet port pipe 21 flows to a hot side outlet port 34, the heat transfer fluid 17 absorbs a heat generated by a magnetocaloric effect of a magnetocaloric material 12 having a magnetic field applied thereto and exits to a hot side outlet port pipe 33 through a hot side outlet port ports 34 to cool the magnetocaloric material 12. A hot side sequentially passes the hot side outlet port pipe 33, a valve 71, a pump 60, and a hot heat exchanger 62 and flows into a magnetic heat exchange compartment 13. In a hot side inlet port pipe 31, the hot side is divided into the hot side inlet port pipe 31 and a cold side outlet port 23, and meets a cold side at a cold side outlet port pipe 24 and proceed to a valve 74. When the hot side moves from a hot side inlet port 32 to the cold side outlet port pipe 24, the hot side is cooled by passing the magnetocaloric material 12 already cooled by the hot side. The cold side that has passed through the valve 74 passes a cold heat exchanger 63 and flows to pipes 83 and 21 to repeat a cycle (a detailed description is omitted. See U.S. Pat. No. 6,668,560 for omitted reference numerals).

As described above, since the conventional magnetic refrigerator comprises twelve magnetic heat exchange compartments, four valves 71, 72, 73 and 74 and more than 24 pipes, it is difficult to manufacture the conventional magnetic refrigerator.

Moreover, since a single heat transfer fluid is circulated to serve as the hot side and the cold side simultaneously, that is, since the hot side enters at the hot side inlet port 32 to pass the cold magnetocaloric material (See FIG. 2) and cooled into the cold side to exit through the cold side outlet pipe 24, a efficiency of a heat exchange is degraded. It is known from this fact that when the heat transfer fluid having a temperature lower than that of the hot side entering the hot side inlet port 32 enters the hot side inlet port 32 and passes the cooled caloric material, the heat transfer fluid having a temperature lower at the cold side outlet pipe 24 may be flown out to improve the efficiency of the heat exchange.

In addition, since amount of the heat transfer fluid passing through the hot side cannot be controlled, a heat of the magnetocaloric material cannot be cooled promptly, thereby degrading the efficiency of the heat exchange.

On the other hand, since a fine mesh is used at the outlet port in order to prevent a problem that the magnetocaloric material of a power type is lost by the heat transfer fluid (coolant), the coolant cannot be circulated smoothly.

Moreover, since the coolant continues to pass the magnetocaloric material at the same spot, a smooth heat exchange is difficult.

In addition, a gadolinium having a microscopic size may be lost when the coolant enters or exits the magnetic heat exchange unit.

SUMMARY

It is an object of the present invention to provide a magnetic refrigerator wherein a hot side and a cold side are divided to simplify a structure, to achieve a high heat efficiency, and to be capable of controlling an amount of a heat transfer fluid.

In order to achieve the above-described object, there is provided a magnetic refrigerator, comprising: a magnetic heat exchange unit including a magnetocaloric material for passing a flow of a heat transfer fluid; a hot heat exchange circulating member; a cold heat exchange circulating member; a first solenoid valve connected to a junction of an inlet port of the magnetic heat exchange unit, an outlet port of the hot heat exchange circulating member and an outlet port of the cold heat exchange circulating member; and a second solenoid valve connected to a junction of an outlet port of the magnetic heat exchange unit, an inlet port of the hot heat exchange circulating member and an inlet port of the cold heat exchange circulating member.

In accordance with the refrigerator, a hot side and a cold side are divided to simplify a structure, to achieve a high heat efficiency, and to be capable of controlling an amount of a heat transfer fluid.

In accordance with the refrigerator, when a pump is installed at the hot heat exchange circulating member or the cold heat exchange circulating member, a heat exchange time may be reduced and a heat exchange efficiency is improved since a pressure of the pump through a closed cycle is sufficiently transferred to the heat transfer fluid.

On the other hand, when the magnet member comprises a permanent magnet and a push-pull unit for pushing the permanent magnet the toward and pulling the permanent magnet away from the magnetic heat exchange unit, a single magnetic heat exchange unit may be used.

It is preferable that the push-pull unit comprises a yoke having the permanent magnet disposed at both sides thereof, and a reciprocation transfer member for carrying out a reciprocation of the yoke, wherein the reciprocation transfer member comprises a rack attached to the yoke, a pinion engaged with the rack, and a motor for transferring a rotational power to the pinion.

On the other hand, the magnet member may be an electromagnet.

It is preferable that the magnetic heat exchange unit comprises a case including the magnetocaloric material, the inlet port disposed at a top surface of the case and the outlet port disposed on a bottom surface of the case.

When the magnetocaloric material comprises a plurality of magnetocaloric material pieces arranged in the case to have a gap therebetween, a mesh is not require, thereby allowing a smooth flow of the heat transfer fluid.

It is preferable that each of the plurality of magnetocaloric material pieces comprises a gadolinium plate or a gadolinium rod having a constant circular cross-section in a lengthwise direction.

When the gadolinium rod comprises a groove in the lengthwise direction, a contact area being in contact with the heat transfer fluid is increased, thereby improving the heat exchange efficiency.

DETAILED DESCRIPTION

The above-described objects and other objects and characteristics and advantages of the present invention will now be described in detail with reference to the accompanied drawings.

Figure 3:
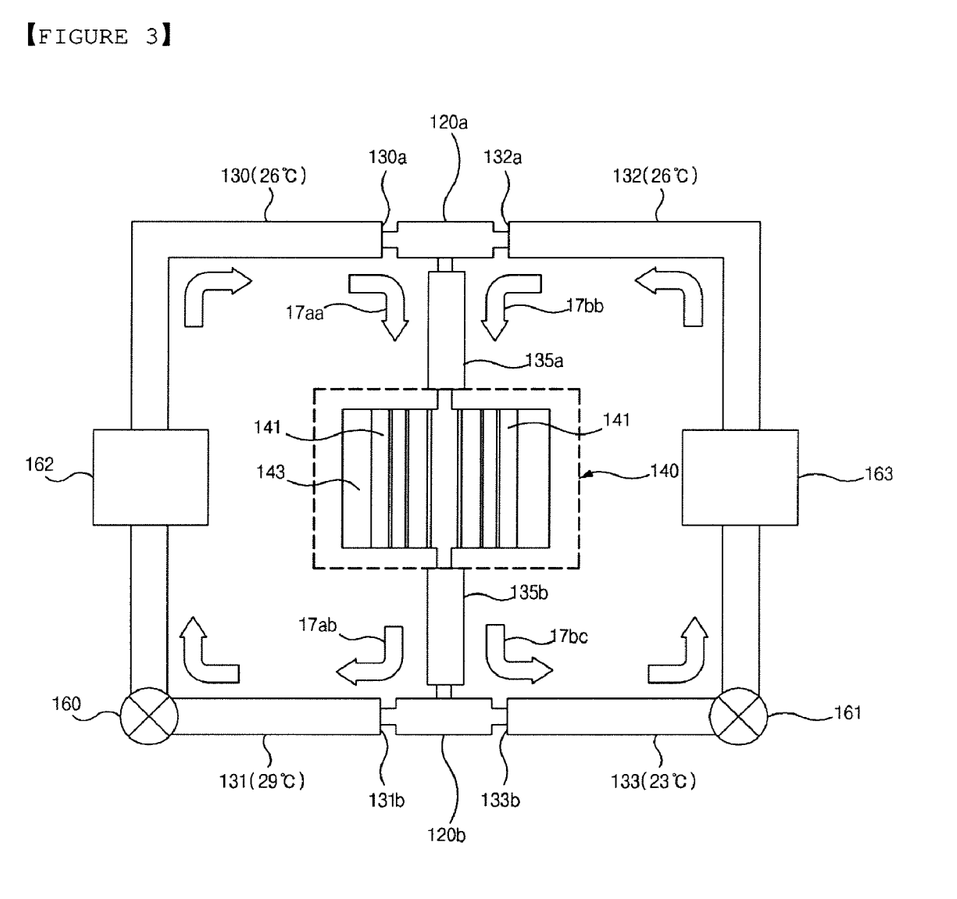
FIG. 3 is a configuration diagram illustrating a magnetic refrigerator in accordance with a preferred embodiment of the present invention.
Figure 4:
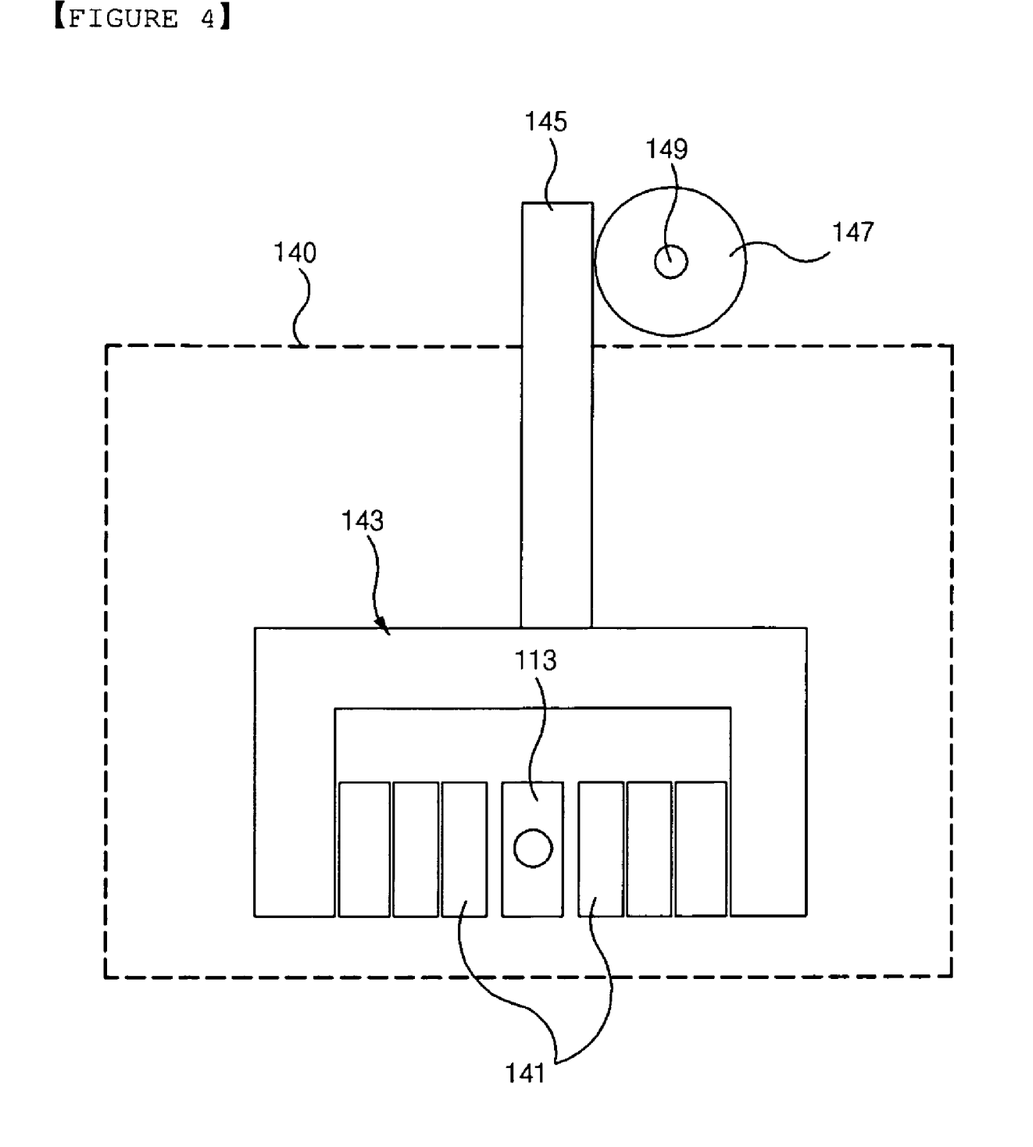
FIG. 4 is a diagram illustrating a push-pull member.
Figure 5:
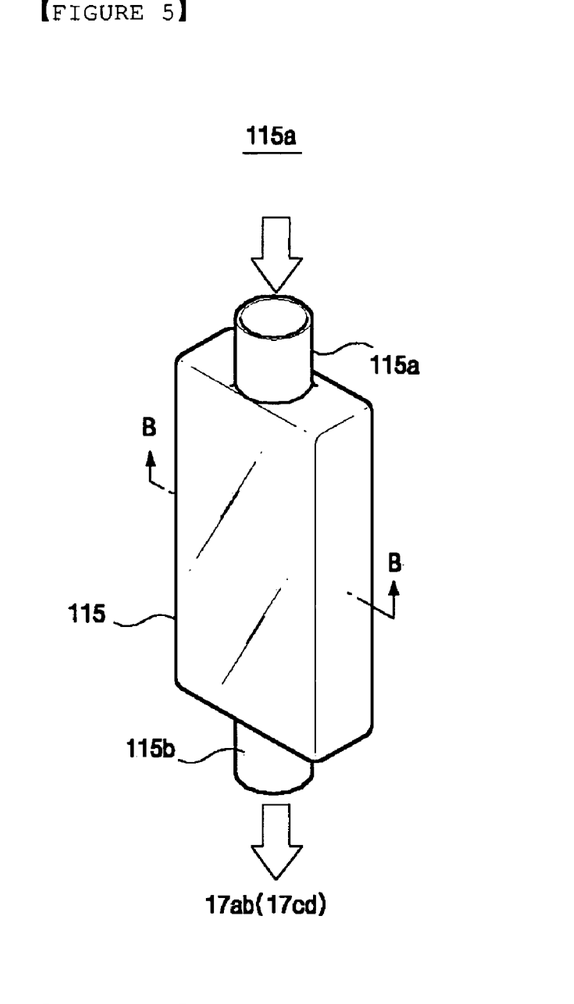
FIG. 5 is a perspective view illustrating a magnetic heat exchange unit in accordance with a preferred embodiment of the present invention.

FIG. 3 is a configuration diagram illustrating a magnetic refrigerator in accordance with a preferred embodiment of the present invention, FIG. 4 is a diagram illustrating a push-pull member, and FIG. 5 is a perspective view illustrating a first magnetic heat exchange unit in accordance with the preferred embodiment of the present invention.

As shown in FIGS. 3 through 5, the magnetic refrigerator in accordance with the preferred embodiment of the present invention comprises a magnetic heat exchange unit 113 including a magnetocaloric material for passing heat transfer fluids 17*a* and 17*b*, a magnet member 140 for applying or erasing a magnetic field, a hot heat exchange circulating member, a cold heat exchange circulating member, a first solenoid valve 120*a* and a second solenoid valve 120*b*.

The heat transfer fluids 17*a* and 17*b* are divided into a first heat transfer fluid 17*a* circulating in the hot heat exchange circulating member, and a second heat transfer fluid 17*b* circulating in the cold heat exchange circulating member to form a cycle.

The hot heat exchange circulating member comprises a hot heat exchanger 162, a first pipe 130 for moving a first heat transfer fluid 17*aa* at a cold side outlet of the hot heat exchanger 162 to a hot side of the magnetic heat exchange unit 113, and a second pipe 131 for moving a first heat transfer fluid 17*ab* to a hot side inlet of the hot heat exchanger 162, wherein the first heat transfer fluid 17*ab* absorbs a heat of a magnetocaloric material 112 by passing through the hot side of the magnetic heat exchange unit 113.

Similarly, the cold heat exchange circulating member comprises a cold heat exchanger 163, a third pipe 132 for moving a second heat transfer fluid 17*bb* at a hot side outlet of the cold heat exchanger 163 to the cold side of the magnetic heat exchange unit 113, and a fourth pipe 133 for moving a second heat transfer fluid 17*bc* to a cold side inlet of the cold heat exchanger 163, wherein the second heat transfer fluid 17*bc* emits a heat to the magnetocaloric material 112 to be cooled by passing through the cold side of the magnetic heat exchange unit 113.

The first solenoid valve 120*a* is connected to a junction of an inlet port 115*a* of the magnetic heat exchange unit 113, an outlet port 130*a* of the hot heat exchange circulating member and an outlet port 132*a* of the cold heat exchange circulating member.

That is, the first solenoid valve 120*a* is a 3port-2way solenoid valve, wherein a first inlet port thereof is connected to the outlet port 130*a* of the first pipe 130, and a second inlet port thereof is connected to the outlet port 132*a* of the third pipe 132. An outlet port of the update scheduler 120 is connected to the magnetic heat exchange unit 113, i.e. a fifth pipe 135*a* connected to the inlet port 115*a* of the magnetic heat exchange unit 113 to be more specific.

Similar to the first solenoid valve 120*a*, the second solenoid valve 120*b* is connected to an outlet port 115*b* of the magnetic heat exchange unit 113, an inlet port 131*b* of the hot heat exchange circulating member and an inlet port 133*b* of the cold heat exchange circulating member.

That is, a first outlet port of the second solenoid valve 120*b* is connected to the inlet port 131*b* of the second pipe 131 and a second outlet port thereof is connected to the inlet port 133*b* of the fourth pipe 133. An inlet port of the second solenoid valve 120*b* is connected to the magnetic heat exchange unit 113, i.e. a sixth pipe 135*b* connected to the outlet port 115*b* of the magnetic heat exchange unit 113 to be more specific.

As described above, in accordance with a structure of the first solenoid valve 120*a* and the second solenoid valve 120*b*, a heat exchange is possible with the single magnetic heat exchange unit 113.

In addition, the cycle is divided into a hot side cycle and a cold side cycle to control an amount of the heat transfer fluid, to flow more heat transfer fluid to the hot side to be specific, as well as to improve a heat efficiency and simplify a structure.

Moreover, it is preferable that the refrigerator further comprises a pump at the hot heat exchange circulating member or the cold heat exchange circulating member.

That is, as shown in FIG. 3, the hot heat exchange circulating member and the cold heat exchange circulating member embodies a close cycle similar to a closed circuit. Therefore, since an atmospheric pressure does not act on the heat transfer fluid directly, almost no resistance is applied to the pumps 160 and 161, thereby reducing a time required for the heat exchange and improving the heat efficiency by a smooth circulation of the heat transfer fluid (a pressure adjustment range is increased according to a size and the heat efficiency of the magnetic heat exchange unit).

The magnetic heat exchange unit 113 comprises the magnetocaloric material 112 which passes the flow of the heat transfer fluid. The magnetocaloric material 112 has a characteristic wherein the temperature thereof is changed when the magnetic field is applied. The magnetocaloric material 112 comprises a gadolinium (Gd) of a fine powder type. The gadolinium has pores having a high osmosis to the flow of the heat transfer fluid, and a superior absorption and emission of a heat.

FIRST EMBODIMENT

The Magnetic Heat Exchange Unit 113

Figure 6:
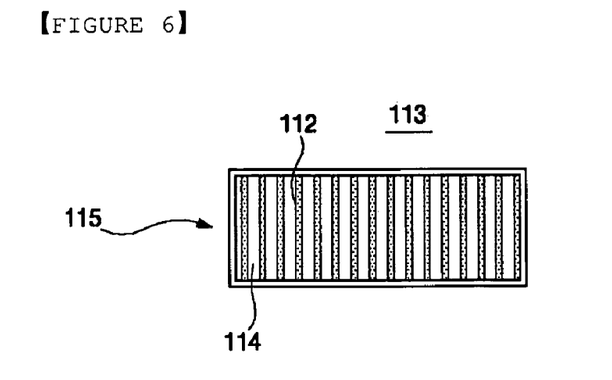
FIG. 6 is a cross-sectional view taken along a line B-B of FIG. 5.

As shown in FIGS. 5 and 6, the magnetic heat exchange unit 113 in accordance with a first embodiment comprises a case 115 extending vertically, and a plurality of magnetocaloric material pieces 112 disposed in the case 115 to form a gap 114.

The inlet port 115a is disposed on a top surface of the case 115 to be connected to the outlet port of the fifth pipe 135a, and the outlet port 115b is disposed on a bottom surface of the case 115 to be connected to the outlet port of the sixth pipe 135b.

The magnetic heat exchange unit 113 may be manufactured by arranging and mounting the magnetocaloric material 112 while the case 115 is disassembled in two parts, and then assembling, bonding or welding the parts.

The case 115 in accordance with the embodiment may be connected to the inlet port 115a and the outlet port 115b to be supported. The support improves the heat exchange efficiency by establishing an adiabatic state wherein the magnetocaloric material 112 of the magnetic heat exchange unit 113 is not exposed.

The magnetocaloric material 112, which have a shape of a plate manufactured from a gadolinium powder, are disposed in parallel in a manner that the gap 114 prevents a contact with the case. The magnetocaloric material 112 of the gadolinium plate may be a thin foil or a thick sheet according to a flow velocity and the heat exchange rate of the heat transfer fluid.

As described above, the magnetocaloric material 112 having the gap 114 prevents the loss of the material even when a mesh is not used, a contact with the entire the magnetocaloric material 112 as well as a smooth flow is obtained since the heat transfer fluid flows through the gap 114, and a higher heat exchange rate compared to that of the conventional art is obtained since a contact area is larger in case of the gadolinium plate.

SECOND EMBODIMENT

The Magnetic Heat Exchange Unit 113

Figure 7:
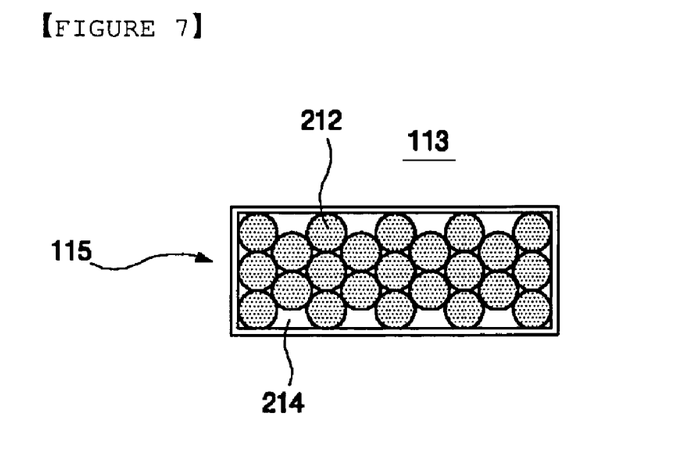
FIGS. 7 through 9 are cross-sectional views taken along a line B-B of FIG. 5 in accordance with another preferred embodiment of the present invention.

As shown in FIG. 7, the magnetic heat exchange unit 113 in accordance with the second embodiment comprises a plurality of magnetocaloric material pieces 212 having a shape of a rod instead of the magnetocaloric material 112 having the shape of the plate. That is, each of the plurality of magnetocaloric material pieces 212 has the shape of the rod having a constant circular cross-section in the lengthwise direction.

A gap 214 between the plurality of magnetocaloric material pieces 212 having the shape of the rod is formed when in contact or not in contact due to the circular cross-section even when the plurality of magnetocaloric material pieces 212 are randomly arranged such that an effect of the first embodiment is obtained when the heat transfer fluid flows through the gap 214.

It is preferable that the plurality of magnetocaloric material pieces 212 having the shape of a rod are inserted in a batch arranged vertically.

Figure 10:
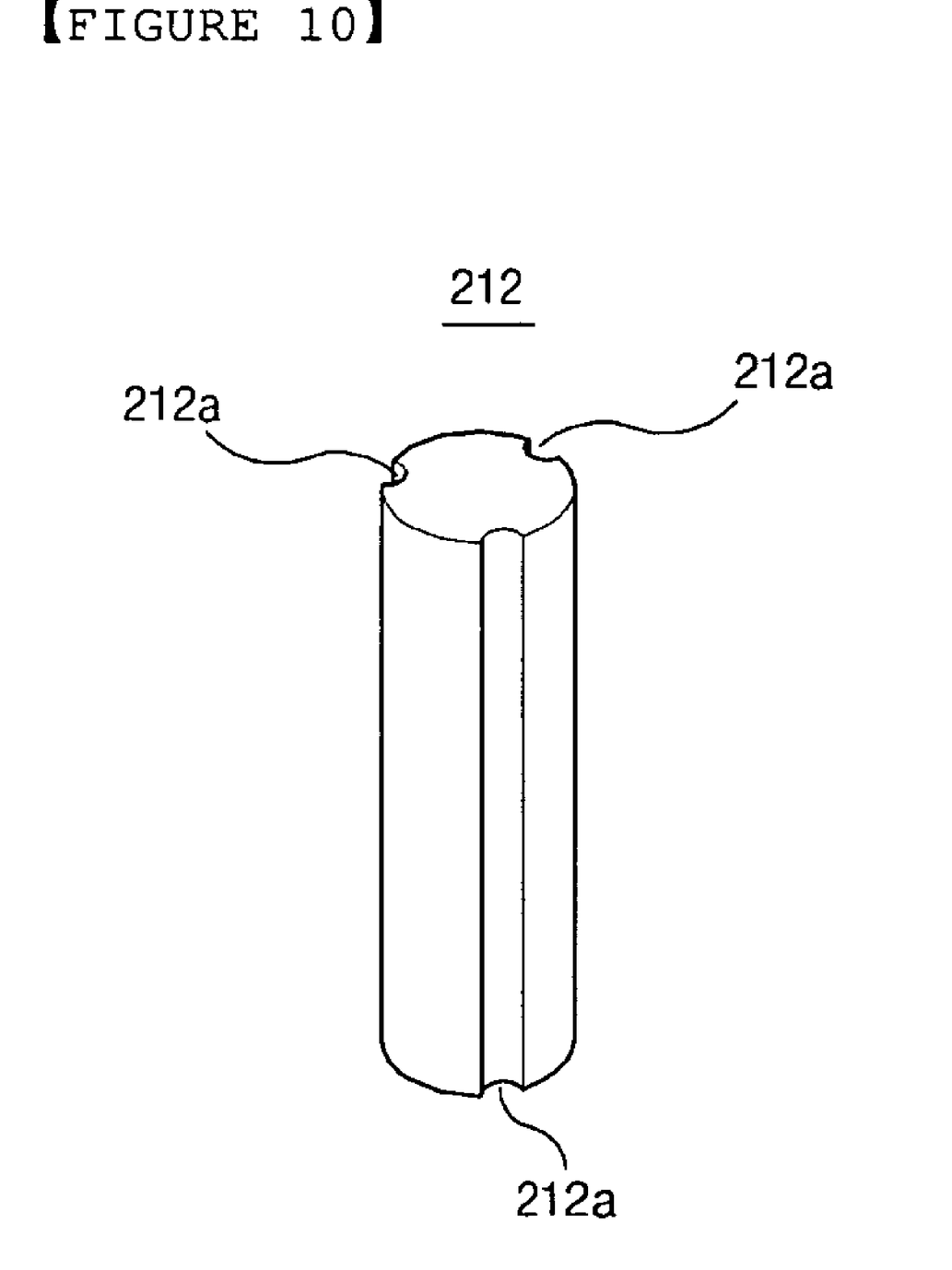
FIG. 10 is a perspective view illustrating a magnetocaloric material piece having a shape of a rod.

On the other hand, as shown in FIG. 10, it is preferable that the plurality of magnetocaloric material pieces 212 having the shape of the rod comprises a groove 212a in a lengthwise direction to increase the contact area with the heat transfer fluid, thereby improving the heat exchange efficiency.

THIRD EMBODIMENT

Magnetic Heat Exchange Unit 113

Figure 8:
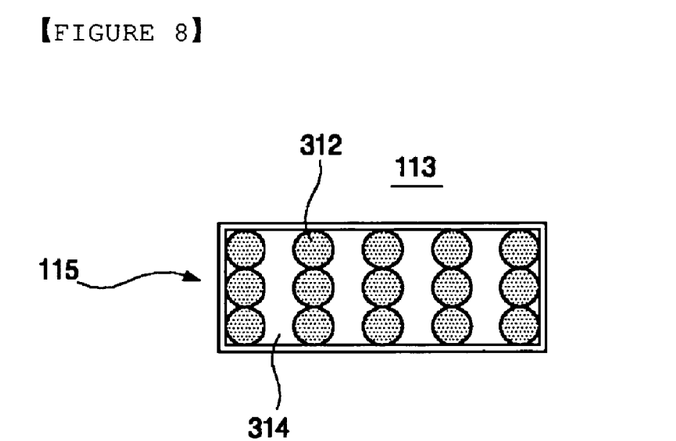

As shown in FIG. 8, the magnetic heat exchange unit 113 in accordance with the third embodiment comprises a plurality of magnetocaloric material pieces 312 having the shape of the rod arranged to have a gap 314 therebetween similar to the plurality of magnetocaloric material pieces 112 having the shape of the plate of the first embodiment instead of a random arrangement of the plurality of magnetocaloric material pieces 212 having the shape of the rod of the second embodiment.

It is preferable that the plurality of magnetocaloric material pieces 312 having the shape of the rod are inserted in a batch arranged vertically.

As shown in FIG. 10, it is preferable that the plurality of magnetocaloric material pieces 312 having the shape of the rod comprises the groove 212a in the lengthwise direction.

FOURTH EMBODIMENT

Magnetic Heat Exchange Unit 113

Figure 9:
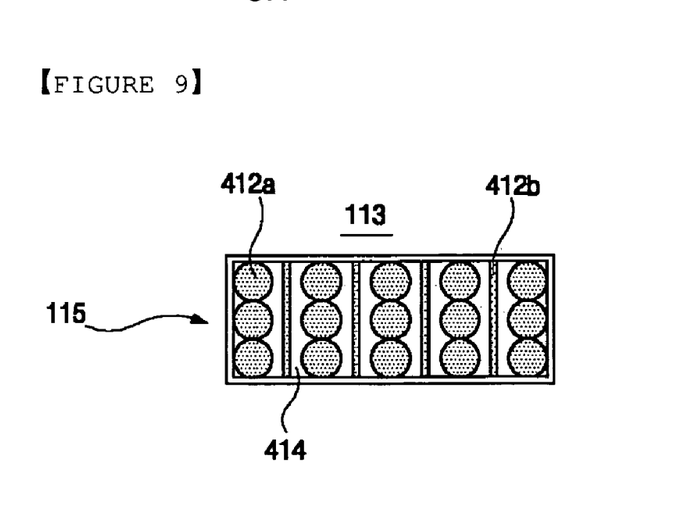

As shown in FIG. 9, the magnetic heat exchange unit 113 in accordance with the fourth embodiment comprises a magnetocaloric material 412a having the shape of the rod and a magnetocaloric material 412b having the shape of the plate having a gap 414 therebetween.

The magnet member 140 may be attached to the magnetic heat exchange unit.

The magnet member 140 may comprise a permanent magnet 141 disposed at both sides of the case 115 and a push-pull unit for pushing the permanent magnet 141 toward and pulling the permanent magnet away from the magnetic heat exchange unit 113, or may comprise an electromagnet (not shown) at the both sides of the case 115.

As shown in FIG. 4, the push-pull unit comprises a yoke 143 having the permanent magnet 141 disposed at both sides thereof, and a reciprocation transfer member for carrying out a reciprocation of the yoke 143.

The yoke 143 serves to concentrate the magnetic field of the permanent magnet 141 in a direction of the magnetic heat exchange unit 113 so that the magnetic field having a higher intensity is applied to the magnetic heat exchange unit.

The reciprocation transfer member may be embodied with a rack 145 attached to the yoke 143, a pinion 147 engaged with the rack 145, and a motor 149 a shaft of which transfers a rotational power to the pinion 147.

The rack 145 may be embodied by forming a tooth on a rod of a link of the yoke 143 or welding a separate rack to the rod.

It will be understood by those skilled in the art that various reciprocation transfer members that convert a rotational motion to a linear motion may be used in accordance with the present invention.

When the electromagnet is used, a current may be applied intermittently to embody applying or erasing the magnetic field.

The cycle of the magnetic refrigerator employing the magnetic heat exchange unit 113 in accordance with the first embodiment of the present invention will now be described wherein the characteristic of the magnetocaloric material is subjected to an experiment by setting an atmospheric temperature which carries out an heat exchange with the hot heat exchanger 162, and an atmospheric temperature which carries out an heat exchange with the cold heat exchanger 163 are set at 26° C. respectively, considering a characteristic of the magnetocaloric material wherein a temperature thereof rises by 3° C. when the magnetocaloric material is magnetized and drops by 3° C. when cooled by the heat transfer fluid.

The entire system except the magnet member 140 is fixed and the magnet member 140 is subjected to the reciprocation motion between the magnetic heat exchange unit 113 to apply and erase the magnetic field. When the magnetic field is applied to the magnetocaloric material, the heat transfer fluid 17aa of the hot side is flown to the magnetic heat exchange unit 113 with a pressure using the solenoid valves 120a and 120b so as to subject the heat (29° C.) of the magnetocaloric material heated by the magnetic field to a first cooling (26° C.). When the first cooling is completed, the magnet member 140 retreats from the magnetic heat exchange unit 113 to erase the magnetic field. When the magnetic field is erased, the heat transfer fluid 17bb of the cold side (26° C.) is flown to the magnetic heat exchange unit 113 with the pressure simultaneously to restore the heat lost in the first cooling. When restoring the heat, the magnetocaloric material absorbs the heat around the material to cool a surrounding. When the surrounding is cooled, the magnetocaloric material is subjected to a second cooling to lower a temperature of the cold side (32° C.) such that the hot side emits the heat (29° C.) through the hot heat exchanger 162, and the cold side emits a cooled temperature (23° C.) through the inlet mesh 16 and the magnetocaloric material pass through the magnetic heat exchange unit again. The above-described cycle is repeated.

At a time that the first solenoid valve 120a and the second solenoid valve 120b switch from the hot heat exchange circulating member to the cold heat exchange circulating member, the temperature drops from 26° C. to 23° C. In addition, since the solenoid valves may easily be programmed digitally, the solenoid valves serve a function of opening a path of the first and the second heat transfer fluids.

As described above, the circulation of the heat transfer fluid is divided into the hot heat exchanger and the cold heat exchanger for the heat exchange of two cycles, thereby simplifying the structure of a magnetic refrigerating cycle.

In addition, in accordance with the system, since the heat transfer fluid at the atmospheric temperature is injected to the magnetocaloric material, the heat transfer fluid is heated and cooled more according to a state of the material to improve an efficiency of the heat exchanger.

Moreover, since the magnetic refrigerator is divided into the hot heat exchanger 162 and the cold heat exchanger 163, amounts of the first heat transfer fluid 17aa and the second heat transfer fluid 17bb are controlled to be different. Therefore, a larger amount of the first heat transfer fluid may be flown to the hot side of the magnetic heat exchange unit to maximize the cooling of the magnetocaloric material.

A single magnetic heat exchange unit may be used due to a use of the 3port-2way solenoid valve, thereby simplifying the structure, and the cycle is systemized, thereby being capable of controlling a heat exchanging time, a pressure and a velocity of the heat transfer fluid.

While the present invention has been particularly shown and described with reference to the preferred embodiment thereof, it will be understood by those skilled in the art that various changes in form and details may be effected therein without departing from the spirit and scope of the invention as defined by the appended claims.

As described above, the magnetic heat exchange unit in accordance with the present invention provides following advantages.

Since the circulation of the heat transfer fluid is divided into the hot heat exchanger and the cold heat exchanger for the heat exchange of two cycles and the heat exchange is carried out by the single magnetic heat exchange unit using the solenoid valve, the structure of a magnetic refrigerating cycle is simplified.

Moreover, since the magnetic refrigerator is divided into the hot heat exchanger and the cold heat exchanger, amounts of the first heat transfer fluid and the second heat transfer fluid are controlled to be different. Therefore, a larger amount of the first heat transfer fluid may be flown to the hot side of the magnetic heat exchange unit to maximize the cooling of the magnetocaloric material.

In addition, the adiabatic state wherein the magnetocaloric material piece is not exposed may be achieved to improve the heat exchange efficiency.

Moreover, the hot heat exchange circulating member and the cold heat exchange circulating member embodies the close cycle similar to the closed circuit. Therefore, since the atmospheric pressure does not act on the heat transfer fluid directly, almost no resistance is applied to the pump, thereby reducing the time required for the heat exchange and improving the heat efficiency. This allows a use of a single pump since the pressure adjustment range is increased according to a size and the heat efficiency of the magnetic heat exchange unit.

The magnetic heat exchange unit is constructed to comprise the case and the plurality of magnetocaloric material pieces disposed in the case to form the gap so that the heat transfer fluid may be flown through the gap, thereby improving the heat exchange efficiency through a uniform contact between the plurality of magnetocaloric material pieces and the heat transfer fluid and eliminating a need for the mesh for the smooth flow of the heat transfer fluid.

In addition, the heat exchange efficiency is improved by increasing the contact area with the heat transfer fluid when the groove is formed on the plurality of magnetocaloric material pieces having the shape of the rod in the lengthwise direction.

Moreover, the magnetocaloric material piece is embodied to have the shape of the plate or the rod, the magnetocaloric material piece is not easily lost.

In addition, since the magnet member comprises the yoke and the push-pull unit, the magnetic field may be applied or erased with the magnetic heat exchange unit fixed, and the yoke concentrates the magnetic field toward the direction of the magnetic heat exchange unit to apply the high intensity magnetic field to the magnetic heat exchange unit Moreover, the heat exchange efficiency is improved by increasing the contact area with the heat transfer fluid when the groove is formed on the plurality of magnetocaloric material pieces having the shape of the rod in the lengthwise direction.

LIST OF REFERENCE SIGNS 60, 160, 161: pump
62, 162: hot heat exchanger
63, 163: cold heat exchanger
13: magnetic heat exchange unit
17aa, 17ab: first heat transfer fluid
17bb, 17bc: second heat transfer fluid
112, 212, 1312, 412a, 412b: magnetocaloric material piece (Gd)
113, 213, 313, 413: magnetic heat exchange unit
114, 214, 314, 414: gap
115: case
115a, 115b: inlet port, outlet port
130, 131, 132, 133: pipe
140: magnet member
141: permanent magnet
143: yoke
145: rack
147: pinion
149: motor shaft

What is claimed is:

1. A magnetic refrigerator, comprising:
a magnetic heat exchange unit comprising a case housing a plurality of magnetocaloric material pieces for passing a flow of a heat transfer fluid, the magnetocaloric material pieces comprising gadolinium and including plate-shaped magnetocaloric material pieces arranged alternately with rows of rod-shaped magnetocaloric material pieces with gaps between adjacent plate-shaped pieces and rows of rod-shaped pieces, the rod-shaped pieces having a uniform cross-section in a lengthwise direction;
a magnetic member for applying a magnetic field to the magnetic heat exchange unit or erasing a magnetic field from the magnetic heat exchange unit;
a hot heat exchange circulating member;
a cold heat exchange circulating member divided from the hot heat exchange circulating member in relation to circulation of the heat transfer fluid;
a first solenoid valve connected to a junction of an inlet port of the magnetic heat exchange unit, an outlet port of the hot heat exchange circulating member and an outlet port of the cold heat exchange circulating member; and
a second solenoid valve connected to a junction of an outlet port of the magnetic heat exchange unit, an inlet port of the hot heat exchange circulating member and an inlet port of the cold heat exchange circulating member.

2. The refrigerator in accordance with claim 1, further comprising a pump at the hot heat exchange circulating member or the cold heat exchange circulating member.

3. The refrigerator in accordance with claim 1, wherein the magnet member comprises a permanent magnet and a push-pull unit for pushing the permanent magnet toward and pulling the permanent magnet away from the magnetic heat exchange unit.

4. The refrigerator in accordance with claim 3, wherein the push-pull unit comprises a yoke having the permanent magnet disposed at both sides thereof, and a reciprocation transfer member for carrying out a reciprocation of the yoke.

5. The refrigerator in accordance with claim 4, wherein the reciprocation transfer member comprises a rack attached to the yoke, a pinion engaged with the rack, and a motor for transferring a rotational power to the pinion.

6. The refrigerator in accordance with claim 1, wherein the magnet member comprises an electromagnet.

7. The refrigerator in accordance with claim 1, wherein the inlet port is disposed at a top surface of the case and the outlet port is disposed on a bottom surface of the case.

8. The refrigerator in accordance with claim 1, wherein the rod-shaped pieces comprise a groove in the lengthwise direction.

* * * * *